United States Patent [19]

Lasdon et al.

[11] Patent Number: 5,034,242
[45] Date of Patent: * Jul. 23, 1991

[54] LOW CALORIE PEANUT BUTTER-LIKE AND FRUIT PRESERVE PRODUCT AND PROCESS

[75] Inventors: Lloyd Lasdon, New York, N.Y.; Harvey Krohn, Westfield, N.J.; Stuart Lasdon, Salt Point, N.Y.

[73] Assignee: Elescon, Inc., New York, N.Y.

[*] Notice: The portion of the term of this patent subsequent to May 9, 2006 has been disclaimed.

[21] Appl. No.: 483,360

[22] Filed: Feb. 22, 1990

[51] Int. Cl.$^5$ ............................ A23L 1/38; A23L 1/20
[52] U.S. Cl. .................................. 426/633; 426/249; 426/457; 426/632
[58] Field of Search ............... 426/633, 249, 632, 457

[56] References Cited

U.S. PATENT DOCUMENTS

| | | | |
|---|---|---|---|
| 3,552,980 | 1/1971 | Cooper et al. | 426/633 |
| 3,689,287 | 9/1972 | Mitchell, Jr. | 99/126 |
| 3,800,056 | 3/1974 | Mitchell, Jr. | 426/457 |
| 4,113,889 | 9/1978 | Baxley | 426/509 |
| 4,828,868 | 5/1989 | Lasdon et al. | 426/633 |
| 4,828,868 | 5/1989 | Lasdon et al. | 426/633 |

OTHER PUBLICATIONS

Harris et al., Development and Use of Defatted Peanut Flours, Meals, and Grits, Bulletin 431, Apr. 1972, Agricultural Experiment Station, Auburn University, Auburn, Alabama, pp. 33 and 34.

Primary Examiner—Donald E. Czaja
Assistant Examiner—John Mowbray
Attorney, Agent, or Firm—Kenyon & Kenyon

[57] ABSTRACT

A low calorie, low fat peanut butter-like and fruit preserve product that exhibits rich peanut flavor characteristics, texture, and mouth feel approximating conventional peanut butter is made from defatted peanut flour, either unroasted or roasted, that is mixed with from about one to about three times its weight of water, milled either dry or in the presence of water until the maximum particle size of the flour is smaller than about 200 microns, and then cooked at temperatures between about 80 degrees C. and the boiling point until approximating the texture and flavor of conventional peanut butter. The resulting peanut butter-like component is compatible with either conventional preserves made with natural sugars or with low calorie preserves made with artificial non-nutritive sweeteners. Combining of the peanut butter-like component and a fruit preserve (either conventional or low calorie) in separate discrete phases at weight ratios of from about 2:1 to about 4:1 results in a flavor-stable, low calorie, low fat peanut butter-like and preserve product having an extensive shelf life either as a refrigerated or, with appropriate further processing, a shelf stable product.

8 Claims, No Drawings

LOW CALORIE PEANUT BUTTER-LIKE AND FRUIT PRESERVE PRODUCT AND PROCESS

BACKGROUND OF THE INVENTION

1. Technical Field

The present invention relates generally to prepared peanut food products, and particularly to low calorie, low fat peanut products, such as peanut butter-like products, that are prepared and packaged either alone or in combination with jelly, jam, fruit spreads, conserves, marmalades and other similar preserves containing natural sugars or artificial sweeteners.

2. Related Art

Peanut butter is the eighth most popular food in the United States; it can be found in over 95 per cent of American homes. Its popularity is due to its unique mouth feel, the flavor of roast peanuts it delivers, and its excellent nutritional values.

The principal way that peanut butter is consumed is as a spread on bread or toast. Consumers often combine it with a preserve such as jelly, jam, fruit spread, conserve, marmalade, or similar high sugar-containing product. The flavor combination of roasted peanuts and fruit preserves is wonderful and is relished traditionally by children but also increasingly by adults.

There are a number of "peanut butter and jelly" type of products on the market, but their appeal is limited mainly to children. First of all, their flavor characteristic is primarily sweet, because the peanut flavor ranges from bland to almost nonexistent. Secondly, for weight-conscious adults, their high calorie, high fat content is a significant deterrent.

The flavor problem occurs because peanut butter is an oil-based system, commonly containing between 49% and 54% oil (natural peanut oil). It is well known in the peanut industry that water severely degrades the natural flavor elements of peanut butter, and peanut butter producers employ systems in their processes to insure the low moisture content of their products. Even the moisture absorbed over time in a partially consumed jar of peanut butter is enough to degrade the flavor, as every peanut butter lover is aware.

Preserves, such as jellies, jams, and fruit spreads, are all water-based products. When these products are blended with peanut butter, in time the water in the preserves will migrate into the peanut butter. Peanut protein exhibits a strong affinity for water. This property accounts for the familiar "sticky" mouth feel that consumers associate with peanut butter. The compounds that provide the roast peanut flavor in peanut butter are very sensitive to water, and the flavor will begin to change noticeably within hours after exposure to moisture. This condition intensifies with time; so that after only a few days of exposure, peanut butter that is in contact with water-based preserves has lost much of its roast peanut flavor notes and become bland.

While natural peanut butter is a generally healthful food, many nutritionists regard it as too rich in fats and calories. Peanut butter typically contains about 50% fat and has about 600 calories per 100 grams (or approximately 190 calories per 32 gram (two tbsps) serving). High fat content is an important factor in the rich taste and mouth feel of peanut butter, but it also renders normal peanut butter inadvisable for people who are calorie conscious, or who suffer from heart or artery disease.

Since preserves have little or no fat, combining peanut butter with a preserve can reduce the proportion of fat in the mixture. Although there is no critical range of proportions, consumers usually combine peanut butter with jelly, jam, or other fruit spreads in ratios ranging from about 2:1 to 4:1 (peanut butter to preserve) by weight. Even though the proportion of fat is reduced somewhat, this combination still constitutes a high calorie food.

Some work has been done to create low calorie, reduced fat whole peanut and peanut flour products. For example, the calorie content of whole peanuts has been reduced by partial removal of fats through a compression process, and low calorie, low fat peanut flours have been prepared by pressing and then milling either raw or roasted peanuts. As described in U.S. Pat. Nos. 3,947,599 and 4,113,889, these reduced fat content peanut flours have lost their peanut flavor characteristics and are very bland, almost tasteless. These patents propose using such flour as a base protein material for various food products, such as baked goods or protein extenders, but they do not suggest their use for low calorie, low fat peanut butter type products. The peanut flours described in these patents, in addition to having a bland taste, are generally dry, having water contents of under 5%.

The Agricultural Experiment Station of Auburn University has conducted extensive research into ways to use defatted peanuts in food products. In Bulletin 431 dated April 1972, entitled "Development and Use of Defatted Peanut Flours, Meals, and Grits," the acceptability of various food products made with defatted peanut flours is reported. In addition to breads, cakes, crisps, puddings, and ice creams, several peanut-honey spread recipes were tested. In none of these recipes did the weight of peanut flour exceed the weight of honey, and best results were obtained when the ratio of peanut flour to honey was 1:2. The score for flavor tests, however, was only 7.1 on a scale of 1 to 10. In retrospect, this is not so surprising; the amount of peanut flour would be too low to impart any peanut flavor even if it had any. The Bulletin listed on attempts to use defatted peanut flours to produce a low fat peanut butter, and, in fact, regular peanut butter was used in some peanut flour ice cream recipes to improve the flavor and texture.

More recently, Australian Patent Application No. 74497/87, published on Oct. 6, 1988 (corresponding to U.S. Pat. No. 4,828,868 issued to the present inventors on May 9, 1989), disclosed a low calorie peanut butter-like product and a process for making it from unroasted defatted peanut flour so that the resulting product has a desirable roast peanut flavor characteristic and a texture that nearly approximates that of generic peanut butter. There is no teaching in this document that a suitable peanut butter-like product could be made from roasted peanut flour or that a combination peanut butter-like and fruit preserve product could be provided that would maintain a desirable roast peanut flavor in the peanut component over a prolonged storage period.

BRIEF SUMMARY OF THE INVENTION

It is an object of this invention to provide a process for the production of a low calorie peanut butter-like product that has a reduced fat content and maintains a desirable roast peanut flavor characteristic over a prolonged period, whether packaged alone or combined with fruit preserves.

It is a further object of the present invention to produce a low calorie, low fat peanut butter-like product from defatted peanut flour, either roasted or unroasted, which has a texture that closely approximates that of conventional peanut butter and has a rich roasted peanut flavor, the flavor being retained over a normal shelf life, either refrigerated or packaged to be shelf stable, even when the product is premixed with a water-based fruit preserve.

These and other objects are achieved by the present invention in which a flavorful low calorie, low fat peanut butter-like product is produced by milling defatted peanut flour in water. The flour may be either unroasted or roasted. In flour is ground to a smooth free-flowing consistency having a maximum particle size of about 200 microns, and desirably less than 150 microns. The flour and water mixture is then cooked at a temperature of at least 80 degrees Celsius but less than the boiling point of the water/flour mixture. This upper point is slightly higher than 100 degrees Celsius at atmospheric pressure, due to the colligative properties of the solute. Other ingredients, such as corn syrup, are added at the cooking step, and these may affect the boiling temperature of the mixture. Cooking can also be conducted under pressure, in which case the boiling temperature can substantially exceed 100 degrees C, but is desirable to keep the maximum temperature from getting too high, since flavor values degrade with increasing cooking temperatures.

The resulting peanut butter-like product has a water content of from 35–55 per cent and a fat content of from 1–25 per cent. The product has a peanut flavor characteristic and can be eaten "as is" or enhanced with seasonings, flavorings or the like to develop its peanut butter-like flavor (roast peanut) qualities. In addition, the peanut butter-like product can be mixed with fruit preserves in weight ratios of from at least about 1:1, and preferably from about 2:1 to about 4:1 of the peanut butter-like component to fruit preserve. Mixing can be by any conventional process such as co-extrusion or variegation (a process used in the ice cream industry for introducing multiple flavors) which produces discrete solid phases in alternate proximity, but not intimately blended.

DETAILED DESCRIPTION OF THE PREFERRED EMBODIMENTS

The defatted peanut flour which is used in the present invention may be any commercially available peanut flour having a reduced fat content in the range of 1% to 35%. A typical commercially available defatted peanut flour will have an analysis of about 40% protein, 30% fat, 2.5% fiber, 19% carbohydrates, and the balance water.

The peanut flour is mixed with water in ratios from 1:1 to 1:3 by weight and then is fed into a suitable mill. The milling operation continues until the maximum particle size of the flour is reduced to less than about 200 microns. Any particles larger than this will produce a gritty mouth feel that most consumes will find unpleasant and not characteristic of peanut butter. Additional milling will produce a smoother mouth feel, and, in fact, a maximum particle size of 150 microns is more desirable, and a maximum size of no more than about 75 microns is preferred.

Upon completion of the milling step, the mixture is cooked at a temperature of at least 80 degrees C but no higher than the boiling point of the mixture. The cooking step should last from 35 to 75 minutes and preferably last 40 to 50 minutes. If shorter cooking times are desired, the cooking may be done under pressure and at temperatures higher than the boiling point of the mixture at atmospheric pressure. The cooking temperature should not exceed about 150 degrees C, however, and preferably it should be kept as close as possible to the atmospheric boiling temperature to avoid flavor loss and resulting protein denaturation.

The purpose of cooking the milled mixture is to achieve a peanut butter-like texture and flavor, and to eliminate certain undesirable raw or green peanut flavors if unroasted flour is used. The endpoint of the cooking process is determined by the evolution of a pleasant peanut flavor characteristic. Overcooking, in terms of either time or temperature, after eliminating the raw or green taste characteristics, will cause the peanut butter-like product to become bland and flavorless and could result in protein denaturation.

To reduce overall processing time, the cooking step can be started while the flour/water mixture is still in the milling stage. That is to say, the milling and cooking steps may overlap.

When the desired texture and flavor point has been reached, the peanut butter-like product is removed from the cooker and cooled to a minimum temperature of about 75 degrees. Alternatively, the product may be conveyed to processing equipment for shelf stable packaging. At this stage the peanut butter-like product has a desirable peanut taste characteristic, as well as a water content of about 50% and a texture similar to that of peanut butter. It also has a fat content that is greatly reduced (by as much as 80–95%) below the fat content of conventional peanut butter. Because it has a low acid and high water activity level, it requires refrigeration or further processing for extended shelf life.

If a plain peanut butter-like product is desired, the peanut butter-like component could be packaged at this stage, but the present invention also provides a low calorie combination peanut butter-like and fruit preserve product which can be packaged directly or processed for shelf stable packaging, where the term "fruit preserve" refers to any jelly, jam, fruit spread, conserve, or similar product that is sweetened with either natural sugars or artificial low calorie sweeteners, wherein the combination product maintains a desirable roast peanut flavor in the peanut butter-like phase over a prolonged storage period.

To produce the combination product, the low calorie peanut butter-like component resulting from the above-described processing steps is fed into a co-extruder or variegator with an appropriate fruit preserve to produce a combined peanut and preserve product of alternating discrete phases. As indicated previously, the weight ratio of peanut butter-like component to preserve should be at least 1:1, and preferably from 2:1 to 4:1.

Colorings, seasonings, preservatives, flavorings, and the like may be used to enhance the peanut phase portion of the combination product of this invention. These can be added during the milling step or even at different points of the cooking step, so long as they are thoroughly dispersed in the mixture.

The following is a suitable formula to achieve a peanut butter-like component for use in a combination product that exhibits the desirable properties of the present invention.

TABLE I

| INGREDIENT | AMOUNT |
| --- | --- |
| Defatted Peanut Flour | 9.00 lb |
| Water | 13.50 lb |
| Corn Syrup | 6.75 lb |
| Molasses | 1.875 oz |
| Xanthan Gum | 0.57 oz |
| Lecithin | 0.86 oz |
| Sugar | 0.75 lb |
| Salt | 6.75 oz |
| Coloring | 0.93 oz |
| Potassium Sorbate | 0.54 oz |
| Flavorings | 2.40 oz |

The above recipe will make approximately 30 pounds of a low calorie, low fat peanut butter-like component which has the smooth consistency and roast peanut flavor that consumers associate with conventional peanut butter. For a low calorie peanut butter-like and preserve product, this component is then combined with less than an equal weight of any desired fruit preserve, and preferably between about 7.5 lbs and 15 lbs of a fruit preserve. The combining is done during the packaging step with a co-extrusion or variegating device that maintains the peanut butter-like portion and the fruit preserve in separate phases. The phase separation is not necessary to extend the flavor life of the peanut butter-like portion, since it is already a water based system. Rather, its purpose is to provide a better contrast between the mouth feel and peanut flavor of the peanut butter-like phase and the slippery feel and sweet fruit flavor of the preserve phase. It is this contrast that is the delight of "peanut butter and jelly" aficionados.

The preserve can be either a reduced calorie jelly, jam, or fruit spread type of product having non-nutritive sweeteners, or a conventional jelly, jam, or fruit spread having natural sugars as sweeteners. The combination product will be stable because the low calorie peanut butter-like type product is a water based system compatible with the water base of the jelly, jam, or fruit spread product. In particular, the peanut flavors of the peanut butter-like segment of the product will be, by their nature, water stable and compatible in the combination product. The acidity of the two components will tend to be a composite, somewhere between the 5.9 pH of the low calorie peanut butter-like component and the 4.3 pH of the preserve component.

Many variations and modifications of the low calorie peanut butter-like product and process and the combination peanut butter-like and fruit preserve product of the present invention will be suggested to one of skill in the art upon a reading of the specific embodiments which are described in this specification. The scope of this invention is, however, not limited to the specific embodiments described herein. The present invention is defined and limited only by the claims which conclude this specification.

We claim:

1. A process for the production of a low calorie, low fat peanut butter-like and fruit preserve product, the process comprising the steps of:

milling defatted peanut flour until the maximum particle size of the peanut flour is less than about 200 microns;

blending the peanut flour with water;

cooking the mixture of water and peanut flour at a temperature of between about 80 degrees C and the boiling point of the mixture of peanut flour and water until the mixture attains a consistency and flavor approximately the consistency and flavor of conventional peanut butter;

cooling the cooked mixture to below about 80 degrees C; and combining the cooled peanut butter-like mixture in discrete separate phases with a fruit preserve in a weight ratio of greater than 1:1 of peanut butter-like mixture to fruit preserve.

2. The process of claim 1 wherein the defatted peanut flour has no more then about 35% fat by weight.

3. The process of claim 1 wherein the milling step and the blending step are performed concurrently and comprise mixing peanut flour and water in a weight ratio range of from about 1:1 to about 1:3 of peanut flour to water, and milling the mixture until the maximum particle size of the peanut flour is about 75 microns.

4. The process of claim 1 wherein the cooking step comprises heating the mixture to no higher than the boiling point at atmospheric pressure and maintaining the mixture at said temperature for about 35 to about 75 minutes.

5. The process of claim 1 wherein the combining step comprises blending the peanut butter-like mixture and the fruit preserve in separate phases in a weight ratio of from about 2:1 to about 4:1 of peanut butter-like mixture to fruit preserve.

6. A low calorie, low fat peanut butter-like product combined with a fruit preserve, the combination product being made by the process comprising the steps of:

milling defatted peanut flour having no more than about 35% fat by weight until the maximum particle size of the peanut flour is less than about 200 microns;

blending the peanut flour with water;

cooking the mixture of water and peanut flour at a temperature of between about 80 degrees C and the boiling point of the mixture of peanut flour and water until the mixture attains a consistency and flavor approximating the consistency and flavor of conventional peanut butter;

cooling the cooked mixture to below about 80 degrees C; and combining the cooled peanut butter-like mixture in discrete separate phases with a fruit preserve in a weight ratio of greater than 1:1 of peanut butter-like mixture to fruit preserve.

7. The product of claim 5 wherein the maximum particle size of the blended peanut butter-like mixture is about 75 microns.

8. The product of claim 5 wherein the weight ratio of peanut butter-like mixture to fruit preserve is from about 2:1 to about 4:1.

* * * * *